US010424025B2

(12) United States Patent
Cussen et al.

(10) Patent No.: US 10,424,025 B2
(45) Date of Patent: Sep. 24, 2019

(54) COMPUTER RECONCILIATION OF DATA FROM DISPARATE SOURCES

(71) Applicant: Coupa Software Incorporated, San Mateo, CA (US)

(72) Inventors: Stephen Cussen, Albuquerque, NM (US); Christopher Yin, Redwood City, CA (US)

(73) Assignee: Coupa Software Incorporated, San Mateo, CA (US)

( * ) Notice: Subject to any disclaimer, the term of this patent is extended or adjusted under 35 U.S.C. 154(b) by 512 days.

(21) Appl. No.: 15/192,593

(22) Filed: Jun. 24, 2016

(65) Prior Publication Data

US 2017/0323393 A1    Nov. 9, 2017

Related U.S. Application Data

(60) Provisional application No. 62/333,700, filed on May 9, 2016.

(51) Int. Cl.
*G06Q 40/00* (2012.01)

(52) U.S. Cl.
CPC .................................. *G06Q 40/12* (2013.12)

(58) Field of Classification Search
CPC ........ G06Q 40/00; G06Q 40/12; G06Q 10/10; G06Q 10/02; G06Q 30/0619; G06Q 20/22; G06Q 10/00

(Continued)

(56) References Cited

U.S. PATENT DOCUMENTS

2008/0167909 A1* 7/2008 de Marcken ........... G06Q 10/02
                                                                              705/5
2014/0052577 A1* 2/2014 Gotlieb .............. G06Q 30/0619
                                                                           705/26.44

(Continued)

*Primary Examiner* — Olusegun Goyea
(74) *Attorney, Agent, or Firm* — Hickman Palermo Becker Bingham LLP

(57) ABSTRACT

A method and system for reconciliation of data from disparate sources is provided. The method comprises storing a plurality of records, each record of the plurality of records associated with a source of the record, a category of the record of a plurality of categories, and one or more dates associated with the record; receiving a first record associated with a first range of dates and a first category of the plurality of categories; generating a first trip record from the first record, the first trip record associated with the dates in the first range of dates; receiving, from a first source, a second record associated with a first date, and a second category of the plurality of categories; associating the second record with the first trip record in response to determining that the first date is one of the dates in the first range of dates; receiving, from a second source, a third record associated with the first date, and the second category of the plurality of categories; associating the third record with the first trip record in response to determining that the first date is one of the dates in the first range of dates; combining the second record and the third record resulting in a merged record in response to determining that the second record and the third record are both associated with the first date, and the second category; determining an amount associated with the merged record by selecting the first source or the second source.

18 Claims, 13 Drawing Sheets

(58) Field of Classification Search
USPC .................................... 705/26.44, 5, 30, 39
See application file for complete search history.

(56) References Cited

U.S. PATENT DOCUMENTS

| | | | |
|---|---|---|---|
| 2014/0214652 A1* | 7/2014 | Zheng | G06Q 20/227 |
| | | | 705/39 |
| 2015/0032768 A1* | 1/2015 | Miller | G06Q 10/02 |
| | | | 707/769 |
| 2016/0078566 A1* | 3/2016 | Farrell | G06Q 40/12 |
| | | | 705/30 |

* cited by examiner

COMPUTER RECONCILIATION OF DATA FROM DISPARATE SOURCES

BENEFIT CLAIM

This application claims the benefit of provisional application 62/333,700, filed May 9, 2016, the entire contents of which is hereby incorporated by reference as if fully set forth herein, under 35 U.S.C. § 119(e).

FIELD OF THE DISCLOSURE

The technical fields of the present disclosure are databases and file systems, and management of duplicate data that is received from multiple sources. SUGGESTED ART UNIT: 2161/707.

BACKGROUND

When planning a project that involves multiple entities working in cooperation with one another, each entity sometimes sends and receives, using distributed networked computers, data about each entity's role, requirements, or outputs to a central entity. This data may include duplicate data that, if processed using a server computer or other central system without proper de-duplication, will result in errors and inaccurate results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a portion of a user interface listing received expenses, according to various embodiments.

FIG. 8 is a portion of a user interface depicting a drag and drop instruction to merge two expenses, according to various embodiments.

DETAILED DESCRIPTION

Figure 1:
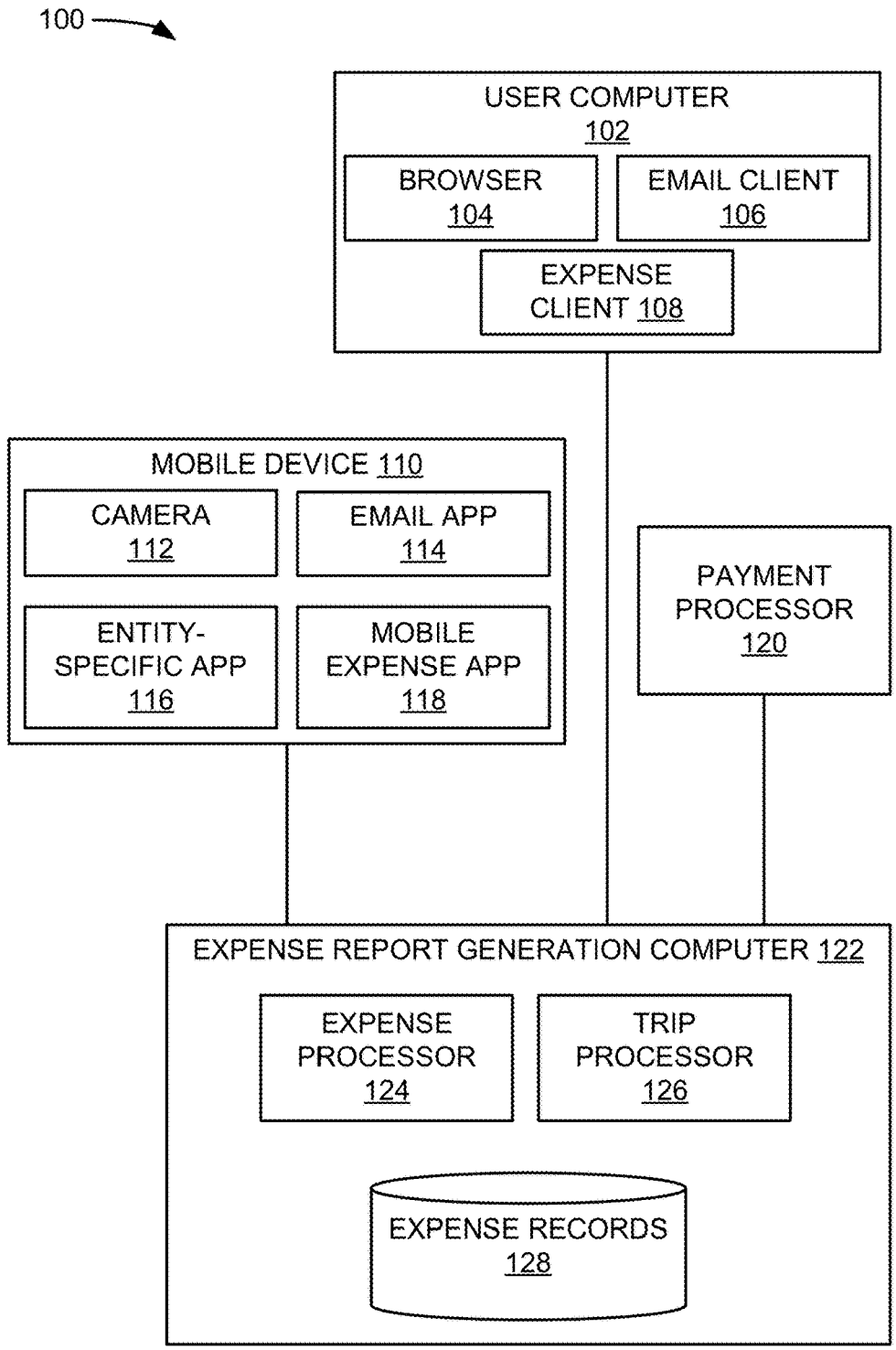
FIG. 1 is an example computer network in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In various embodiments, methods and computer systems are provided that are programmed or configured to perform reconciliation of data from disparate sources. One method comprises storing a plurality of records, each record of the plurality of records associated with a source of the record, a category of the record of a plurality of categories, and one or more dates associated with the record; receiving a first record associated with a first range of dates and a first category of the plurality of categories; generating a first trip record from the first record, the first trip record associated with the dates in the first range of dates; receiving, from a first source, a second record associated with a first date, and a second category of the plurality of categories; associating the second record with the first trip record in response to determining that the first date is one of the dates in the first range of dates; receiving, from a second source, a third record associated with the first date, and the second category of the plurality of categories; associating the third record with the first trip record in response to determining that the first date is one of the dates in the first range of dates; combining the second record and the third record resulting in a merged record in response to determining that the second record and the third record are both associated with the first date, and the second category; determining an amount associated with the merged record by selecting the first source or the second source.

In one embodiment, embodiments are applicable to processing data received by computers as part of an expense reimbursement processing method. For example, during travel, or as part of a project or event, a person, pays for, and accepts charges for various expenditures on behalf of a business entity. For example, when taking a business trip, an employee may purchase airplane tickets, reserve a hotel room, purchase meals or materials, and pay charges associated with the reserved hotel room. When hosting an event, an event manager may reserve a venue and pay deposits for catering, then finalize charges for each. For each reservation and purchase, one or more electronic expense records are generated. As used herein, "expense record" refers to an electronic expense record that is digitally stored in computer memory or data storage devices and that may identify one or more expense items. For example, for a hotel reservation, an email is sent to the employee, a deposit is charged to a credit card associated with the employee, and, in a mobile application program that is installed on a mobile computing device of the employee, a record is generated in a mobile application associated with the hotel chain. Further digital records may be generated from these records as well. For example, from the email, a calendar application may generate a calendar record of the hotel reservation.

In an embodiment, an expense tracking application accesses the expense records that are received from one or more sources. The expense tracking application further identifies potential duplicate expense items, determines whether the expense records are duplicates, and, if so, automatically, without human intervention, merges the items or records to avoid errors. When the expense records are merged, an expense report can be generated that specifies the merged expense items or records and can be submitted to an accounting or bookkeeping computer or application. The expense report may then be used to cause money to be transferred from one or more bank accounts to pay for the expenses.

This disclosure provides a computer-implemented approach for accurately merging expenses in which the functional operation of a computer is improved in a variety of ways. First, by merging duplicate expense items or records into one expense item or record, memory space or persistent storage is saved. Second, computing resources are saved by reducing the number of expense items or records that are managed in a database or other data structure. Third, application program and mobile device processing efficiency is improved by reducing the number of processing cycles, display screens, memory and resources that are required to execute operations to finalize and submit an expense report.

System Overview

FIG. 1 is an example computer network in which various embodiments may be practiced. FIG. 1 is shown in simplified, schematic format for purposes of illustrating a clear example and other embodiments may include other elements. In an embodiment, a computer network 100 comprises a plurality of computers that are sources of expenses input to an expense report generation computer 122. For example, expenses may be received from a user computer 102, a mobile device 110, or a payment processor 120. The expenses may be communicated via one or more networks including a local area network (LAN), Wide Area Network (WAN) such as the interne, or other communications network. The expenses may be communicated using one or more security protocols, such as the HTPPS protocol.

An expense or expense record is an electronic digitally stored record of a transaction and in this disclosure "expense" is used as a term of art to refer to digital data items or records that are stored in computer memory or computer storage, and not to abstract concepts. The expense may be associated with other digital data representing any stage of a transaction, such as a reservation; a deposit confirmation; a non-final bill; an explanation of benefits; an estimate; a permit; a final bill; a charge made to an account including a charge made to a credit, charge, or debit card; or a receipt. The expense may be in the form of an email, a captured image of a paper document such as a check or receipt, a record of a charge made to an account, or a record that is generated in a mobile application program, such as an airline application or a hotel application.

The user computer 102 is a laptop or desktop computer associated with a user. A user is a business owner, employee, or contractor who is authorized to make charges on behalf of a business entity or who has an expectation of being reimbursed for expenses by a business entity. In some embodiments, a business owner may expect to claim an expense as a tax deduction for business expenses made on behalf of the business entity. The user may use the user computer 102 to make air, hotel, or restaurant reservations; or to purchase products through an online retailer or wholesaler. In some instances, a secretary or administrative assistant may incur business expenses for the user.

The user computer 102 comprises a browser 104. The browser 104 is an online web browser. Using the online web browser, the user computer 102 may access web sites that provide booking services such as air, hotel, or restaurant reservations. The user computer 102 may access online vendors to purchase business supplies or other products. Further, the expense report generation computer 122 may provide a web-based application accessible via the web browser to review and submit expense reports.

An email client 106 installed on the user computer 102 comprises programming logic to receive and send emails. The email client 106 may be web-based or be a software application separate from the browser 104. The user computer 102 receives emails including reservation confirmations, electronic receipts, and other expenses. The emails may include details about the expense including an amount, one or more travel dates, and vendor information.

An expense client 108 installed on the user computer 102 comprises programming logic to receive and present expenses to the user computer 102. The expense client 108 may generate one or more user interfaces that allow the user computer 102 to create trips, view expenses and trips, manually merge expenses, finalize expense reports, and submit expense reports.

The mobile device 110 is an embedded device such as a smartphone or tablet computer. In some instances, a user may use only mobile device 110 and may not have a user computer 102. The mobile device 110 may include a camera 112 that captures images. The camera 112 may be used to capture an image of a paper document such as a check or paper receipt. The camera 112 may be invoked by one or more applications running on the mobile device 110 to capture an image.

The mobile device 110 supports mobile applications, or "apps", having programming logic for performing specific tasks. An email app 114 sends and receives email on behalf of the mobile device 110. An entity-specific app 116 is an application published by an entity such as an airline, hotel chain, restaurant chain, or online retailer that tracks reservations or purchases made by the mobile device 110 independently of email messages or a payment processor. The entity-specific app 116 may provide an information feed accessible by the expense report generation computer 122. The information feed may include information such as travel dates, charges, and other details.

A mobile expense app 118 installed on the mobile device 110 comprises programming logic to receive and present expenses to the mobile device 110. The expense app 118 may generate one or more user interfaces that allow the mobile device 110 to manually create trips, view expenses and trips, manually merge expenses, finalize expense reports, and submit expense reports.

A payment processor 120 comprises a computer associated with a payment processing entity such as a bank, a credit card processor, or the like. The payment processor 120 receives payment information from entities receiving payment from the user or user account including airlines, hotels, retailers, wholesalers, and other vendors. The payment processor 120 provides an information feed accessible by the expense report generation computer 122. The information feed may include information such as travel dates, charges, and other details. The payment processor 120 may provide the information feed one or more times per day. The information feed may include expenses associated with a single cardholder or with multiple card holders. For example, in an embodiment where the payment processor is associated with a corporate credit card, the transactions associated with all of the cardholders on the account may be included in the information feed. The information feed may be sorted by cardholder.

Each user associated with the expense report generation computer 122 may, individually, be associated with a single user account and separate user computers 102, mobile devices 110, and one or more payment processors 120. The networked environment 100 therefore includes a plurality of user computers 102, a plurality of mobile devices 110, and various payment processors 120. Each payment processors 120 may be associated with a plurality of the users or a plurality of user accounts.

The expense report generation computer 122 comprises programmed instructions or logic that, when executed by one or more processors, accesses expenses from the sources discussed above, analyzes the expenses, and generates expense reports from the same. The expense report generation computer 122 groups the expenses into trips and merges expenses within trips to generate expense reports that can be finalized and submitted to an accounting department or other authority. In some embodiments, the expense report generation computer 122 may be implemented as part of a larger processing system residing in a cloud computing architecture. In such an architecture, the expense report generation computer 122 may be implemented across two or more machines to implement the functionality associated with the expense report generation computer 122 as described herein.

An expense processor 124 within the expense report generation computer 122 is programmed to access expenses from a plurality of sources. The sources include email messages received by the mobile device 110 or user computer 102 accessed via the email client 106 and/or the email app 114, information feeds provided by entity-specific apps 116 and the payment processor 120, and images of paper documents captured via camera 112.

To access an expense having the form of an email, the expense client 108 or mobile expense app 118 are programmed to access, via an application program interface (API) provided by the email client 106 or email app 114, email messages received from vendors. The expense client 108 or mobile expense app 118 sends information to the expense processor 124. The expense processor 124 may identify email messages relating to expenses using a variety of techniques such as a whitelist containing names of known vendors, or a heuristic algorithm that identifies email messages containing particular elements. Example vendors included on a whitelist may include, for example, names of airlines, hotel chains, restaurants, online retailers, transportation providers, service providers, and the like. The whitelist may be updated as additional vendors are identified by the mobile device 110 or user computer 102 or by the entity associated with the mobile device 110 or user computer 102. An example heuristic algorithm may identify email messages that contain, in a subject line or body of the email, keywords such as "reservation" or "receipt", travel dates, a monetary amount, or other information that is known to be associated with business expenses.

In some embodiments, a user, within the email client 106 or within the email app 114, may manually identify an email message as being a business expense. The user may, for example, select a user interface element provided by the mobile device 110 or user computer 102 corresponding to the expense client 108 or the mobile expense app 118 within the email client 106 of the email app 114. In some embodiments, the mobile device 110 or user computer 102 may forward an email message to an email address associated with the expense processor 124.

To access an expense from an information feed provided by an entity-specific app 116 or by the payment processor 120, the expense processor 124 accesses an application program interface (API) provided by the entity-specific app 116 or by the payment processor 120. The information feed may be associated with more than one of the mobile devices 110 or user computers 102 of the expense report generation computer 122. In such instances, the expense processor 124 may separate the expenses included in the information feed according to a user account associated with a user.

The expense processor 124 is programmed to store the expenses in an expense records database 128. The expense records database 128 may be structured in a variety of ways. Each expense record is associated with a user, a business entity associated with the user such as an employer, a date incurred, a travel date, an amount of money, a vendor, a category, and a trip. The category and the trip are metadata assigned by the expense processor 124 and the trip processor 126, respectively.

The category is assigned to the expense by the expense processor 124. The category is a characterization of the expense. Examples of categories include, but are not limited to, airfare, hotel, lodging, meals, taxi, tolls, transportation, business services and supplies, personal services, entertainment, professional development, beverages, taxes and government fees, venues, and catering. Some categories may be further broken down. For example, meals may be broken down into meals-breakfast, meals-lunch, meals-snack, and meals-supper. The category may be assigned based on keywords included in the expense, a category associated with the vendor, or a category indicated within the expense itself.

From the expenses received by the expense processor 124, the trip processor 126 is programmed to group the expenses into trip records. The trip records, or trips, are associated with a single user and comprise one or more expenses and may include a title. A new expense is added to a trip record when, for example, a date incurred or travel date of the expense is already associated with a trip. If an expense includes a date incurred and a travel date, the travel date is used to associate the expense with a trip. Additional information included in the expense may be used to add the expense to the trip such as, for example, a geographic location associated with the expense or a category assigned to the expense.

The trip processor 126 further is programmed to identify expenses within each trip that can be merged. Expenses may be merged when they are assigned to the same category. The merging of the expenses may include adjusting an amount of money associated with the expense. The trip processor 126 may further provide interfaces to the mobile device 110 or user computer 102 that allow a user to manually provide instructions to merge two expenses, to re-categorize expenses, to delete expenses, to assign an expense to a different trip, to submit an expense report for a trip, or to perform another task.

Method Overview

Figure 2:
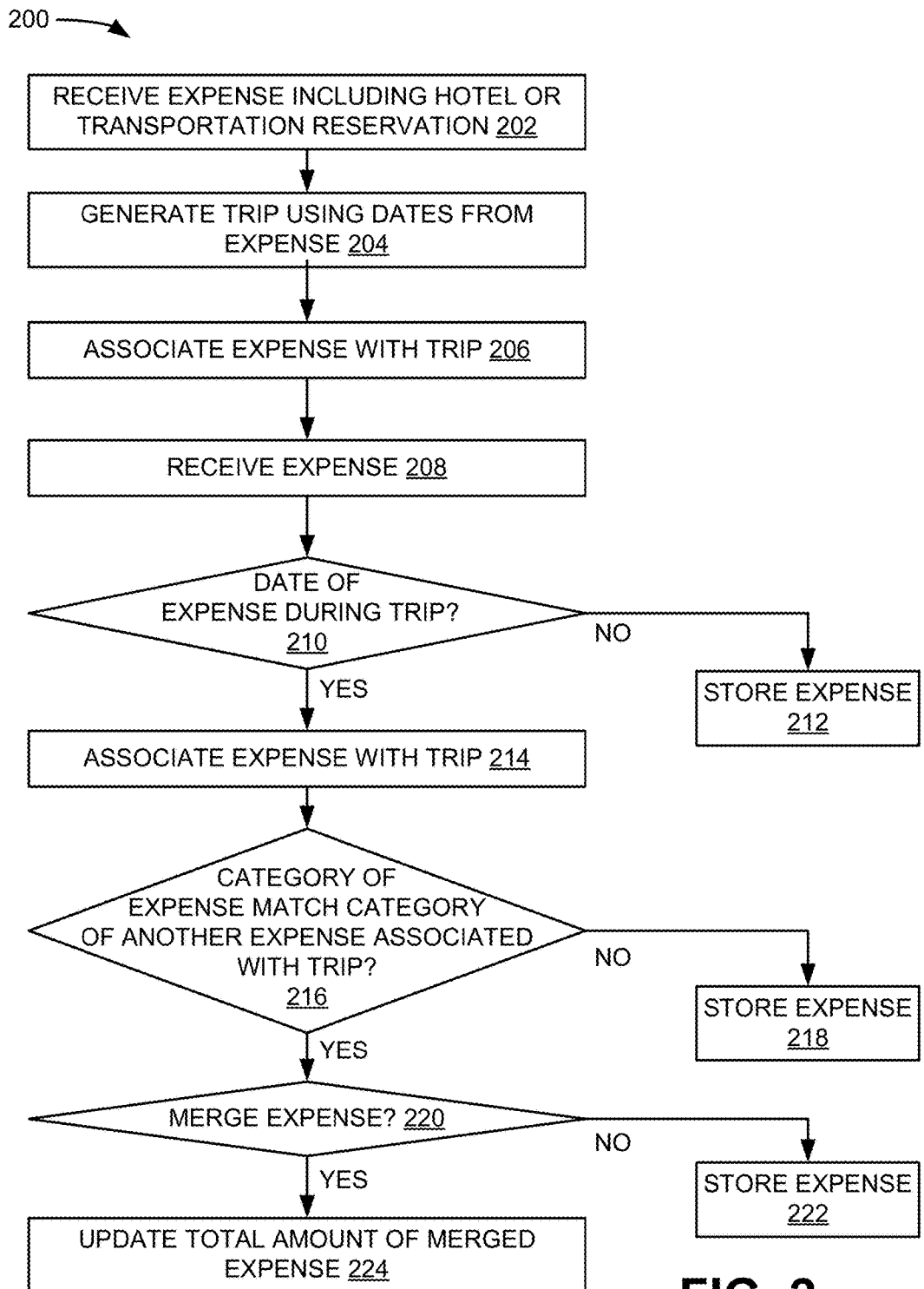
FIG. 2 is a flowchart of an example method of receiving and merging expenses, according to various embodiments.

FIG. 2 is a flowchart of an example method of receiving and merging expenses, according to various embodiments. FIG. 2, and each other flow diagram herein, is intended to illustrate an algorithm that can be programmed for execution by the processing elements of FIG. 1 and can be implemented using a programming language or environment such as JAVA, C++, OBJECTIVE-C, C, scripting systems, and the like. FIG. 2, and each other flow diagram herein, is expressed at the same level of detail that is customarily used by persons skilled in this field to communicate with one another about algorithms, process flows or other information forming a basis of programming executable programs that are configured to accomplish the kinds of tasks that are disclosed herein. In an embodiment, method 200 is performed by the expense report generation computer 122 using programmed instructions. The method 200 is performed as expenses are accessed, to generate trip records and to merge expenses within the trip record. The method 200 may be performed repeatedly as different expenses are accessed and trips are generated for a plurality of users.

In an operation 202, the expense processor 124 accesses or receives an expense such as a hotel or transportation reservation. The expense received in the operation 202 is unique in that it includes a future travel date or range of dates. Typically, when planning a business trip, a user begins by booking air travel or a hotel using the mobile device 110 or user computer 102 so that a first expense incurred in association with a trip is one of a plane ticket or hotel reservation. Further, these expenses include travel dates. For airfare, round-trip airfare includes a departure date and an arrival date. For a hotel reservation, the reservation includes a check-in date and a check-out date, or a check-in date and a number of nights included in the stay from which a check-out date may be determined.

In an operation 204, the travel dates included in the expense of the operation 202 are used to generate a trip record by the trip processor 126. The trip processor 126 may associate the trip record with a plurality of expenses over time as they are incurred and accessed by the expense processor 124.

In some instances, the operation 202 may be skipped in that no expense corresponding to a hotel or transportation reservation is received. In these instances, an expense that does not include a range of travel dates may be received for a date that is not associated with an existing trip. In these instances, the trip processor 126 may generate a trip record for the received expense. The trip record may be associated with the date associated with the expense or with a threshold number of days adjacent to the date associated with the expense. For example, the trip record may be associated with the week or month during which the expense was incurred or for the day the expense was incurred and the following three days.

In an operation 206, the trip processor 126 associates the expense of the operation 202 with the trip generated in the operation 204. The association between the expense record and the trip record is stored in the expense records database 128.

In an operation 208, the expense processor 124 receives another expense from an email message, the camera 112, or an information feed.

In an operation 210, the trip processor 126 determines whether the date of the expense occurs during the date range associated with the trip. The date of the expense is the date the expense is incurred or the travel date. If the expense includes distinct dates incurred and travel dates, the travel dates are used to associate the expense with the trip record. For example, if an airfare reservation is used to generate a trip in operations 202, 204, and 206, for dates April 18 to April 20, and a car rental expense is received on April 19 for travel date May 12, the travel date is used to determine that the car rental expense is not associated with the April trip. Continuing the example, if a restaurant reservation is received on April 15 for dinner on April 19, the restaurant reservation is associated with the trip.

In some embodiments, other information included in the expense may be used to determine whether to associate the expense with a trip. For example, geographic location may be used to determine whether to associate a restaurant receipt with a trip. Some employees may use a personal credit card that they share with a spouse to charge business expenses for reimbursement. If a trip, by virtue of a destination airport or location of a hotel included in the expense of operation 202, is associated with a first geographic location that is distant from the employee's home, expenses associated with the employees's home location are not associated with the trip for the duration of the trip.

In some instances, purchases associated with a particular category may not be associated with a trip regardless of the dates incurred. For example, recurring business expenses, such as utility bills may be charged on a particular day of the month. Expenses in this category may not be associated to a trip established using an expense received in operation 202.

If the expense does not occur during the trip or is otherwise not associated with the trip record, the trip processor 126 stores the expense in an operation 212. The expense may be associated with another trip, may be used to generate a new trip as discussed in connection with operation 204, or be stored as an unassociated expense or in a catch-all trip. Some instances may include a trip that is used for expenses that are not easily associated with any one particular trip. The trip may be associated with a month or week to which unassociated expenses can be associated.

In an operation 214, if the date of the expense occurs during the trip, the trip processor 126 associates the expense with the trip. In some embodiments, the user, using a user interface at the mobile device 110 or user computer 102 and provided by the expense client 108 or the mobile expense app 118, may provide instructions to associate a particular expense to a trip or to disassociate a particular expense from a trip. The expense is then associated or disassociated with the trip per the instructions. The instructions may be in the form of a drag and drop instruction where the user drags a graphical representation of the expense to a graphical representation of the trip. In some embodiments, the user may select a trip from a drop down menu associated with the expense. Other types of instructions may be used to associate or disassociate an expense from a particular trip.

Beginning with an operation 216, the method 200 automatically merges expenses within the trip. More than one expense record can be received for each charge actually incurred. For example, for a hotel charge, four expenses may be received: an initial reservation received via email, a check-in statement received via email, a check-out statement received via email, and a final amount billed to a credit card. Additional expenses may be received from, for example, an information feed provided by a mobile app published by the hotel chain. By merging the expenses, duplicate expenses are removed. Because part of finalizing an expense report is removing these duplicate entries, automatically merging duplicate entries may save employee time that would otherwise be spent finalizing the expense report. The merging operations may be performed repeatedly, asynchronously, and/or independently of whether new expenses have been received since the last time expenses were evaluated.

In the operation 216, the trip processor 126 determines whether the category of the expense matches the category of another expense associated with the trip. In some embodiments, a user, using the mobile device 110 or user computer 102, may manually change a category assigned to an expense by providing instructions to do so to the expense client 108 or the mobile expense app 118. The category may be changed using a drop down menu associated with the category or the expense in the expense client 108 or the mobile expense app 118. Only expenses assigned to the same category may be merged. In some embodiments, expenses assigned to a subcategory of a category may be merged with expenses assigned to the category but not to another subcategory. To illustrate, an expense assigned to category "Meals-Supper" may be merged with an expense assigned to category "Meals" but not with an expense assigned to category "Meals-Breakfast".

In an operation 218, if the categories do not match, the trip processor 126 stores the expense in association with the trip. The expense may later be merged with another expense received later.

In an operation 220, if the categories of the expenses match, the trip processor 126 determines whether to merge the expenses. The determination to merge the expenses can be based on a number of characteristics of the expenses under consideration for being merged. For example, if the vendor's name and the amount associated with the expenses match, the expenses are merged. Some categories may have different rules for determining whether expenses are to be merged. For example, taxi fares may be merged if not only the vendor and amount match, but also that some other data match such as location of pick-up, time of day, or driver identifier.

As an example, if the expenses are a restaurant receipt and a credit card transaction record received from an information feed, the vendor name and the amounts match. Further, a flight booking may include a reservation received weeks before the trip occurs and a credit card transaction may be posted days after the trip is booked. Because the airline and the amount of the ticket matches, the expenses are merged.

In an operation 222, if the vendors do not match and/or the amounts do not match, the expenses are not merged. The expense may later be merged with another expense received later.

In an operation 224, if the expenses are to be merged, such as if the vendors match but the amounts do not match, the trip processor 126 updates a total amount of the merged expense. In embodiments where the vendor matches, but the amount does not, or the amount is missing from one expense, the amount is determined at the time the expenses are merged. If the expense is a hotel booking, a reservation is received prior to the trip and indicating the travel dates. After the trip ends, a credit card transaction is posted by the payment processor 120 with a final amount. Likewise, a car rental may include a first expense received before the trip and a second expense that is a charge posted to a credit card after the trip. To determine the amount to include in the merged expense, the dates of the expenses are used. The more recent expense is considered definitive and the amount in that expense is adopted. Therefore, for the hotel room and the car rental, the credit card charge posted after the trip is used. In some embodiments, such as where a first expense of the expenses indicates that the amount charged is a co-pay or deposit, the expenses are not merged even if they are from the same vendor.

In some embodiments, the various sources of expenses may be organized into a hierarchy such that one source is given deference if an expense received from it conflicts with an expense received from another source. For example, a credit card information feed or charges made to a credit card may be deferred to over an email message which is deferred to over an information feed from an entity-specific mobile app. The hierarchy may be set up by an administrator according to which sources the administrator finds most reliable or trustworthy.

As described in connection with FIG. 2, the expenses are merged within a trip report. In some embodiments, the expenses may, additionally or alternatively, be merged into a file containing a copy of the information feed received from the payment processor 120. The copy of the information feed may be an up to date copy including expenses received over a period of time, expenses that have not yet been reimbursed, or expenses that have not yet been assigned to a particular trip. When merging expenses into the copy of the information feed, the merged expenses and electronic copies of receipts are stored in association with copy of the information feed and in association with a particular expense in the copy of the information feed. For example, the copy of the information feed after expenses are merged with expenses in the information feed may include additional receipts, check-in dates, flight details, alternate vendor names, and other information gathered from the merged expenses.

Manual Merging of Expenses

Figure 3:
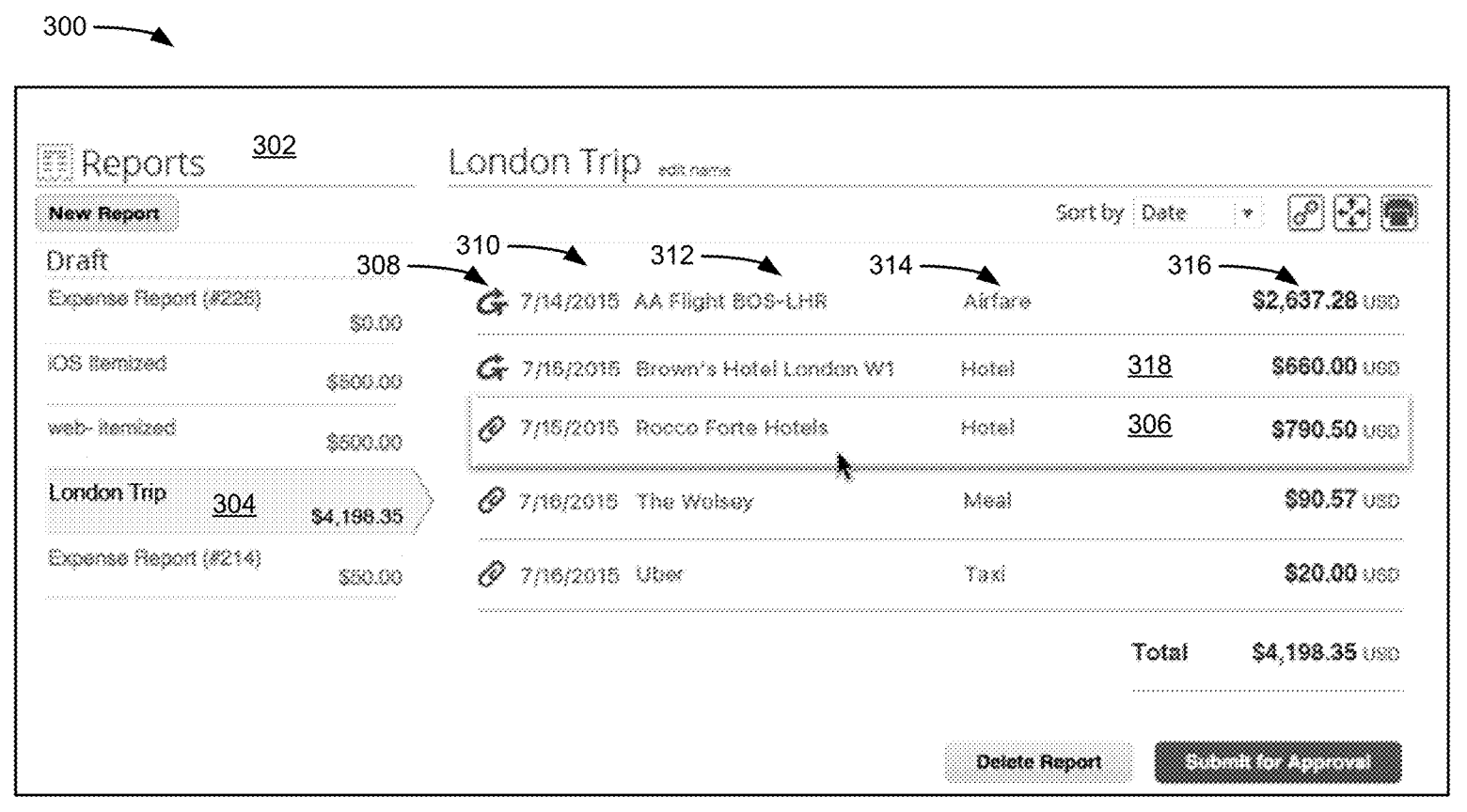

FIG. 3 is a portion of a user interface 300 listing received expenses, according to various embodiments. The user interface 300 may be provided by the expense client 108 or the mobile expense app 118. The user interface 300 includes a list of pending trip records labeled Reports 302. Report 304, labelled London Trip, is expanded on the right side of the user interface 300. The report 304 includes five expenses, including expenses 306 and 318. Each of the expenses is associated with a source identifier 308 which indicates the source of the expense, a travel date 310, a short description of the expense or vendor identifier 312, a category 314, and an amount 316.

In the example shown in FIG. 3, the mobile device 110 or user computer 102 receives an instruction to combine expenses 306 and 318 by input selecting expense 306, both assigned to category "Hotel" but received from different sources, associated with different vendors and different amounts.

Figure 4:
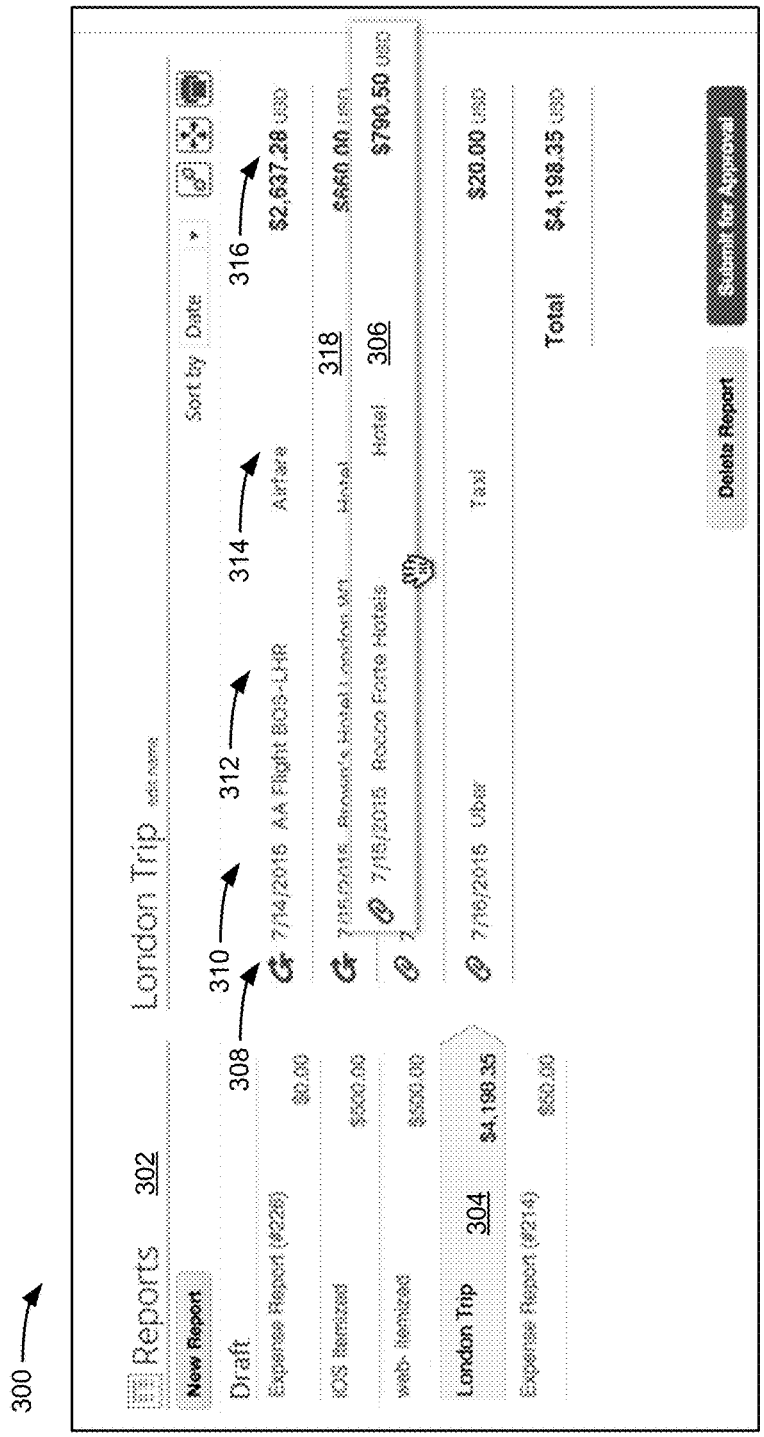
FIG. 4 is a portion of the user interface depicting a drag and drop instruction to merge two expenses, according to various embodiments.

FIG. 4 is a portion of the user interface 300 depicting a drag and drop instruction to merge two expenses, according to various embodiments. The mobile device 110 or user computer 102 provides input that selects the expense 306 and drags it up to overlap with expense 318 before dropping it.

Figure 5:
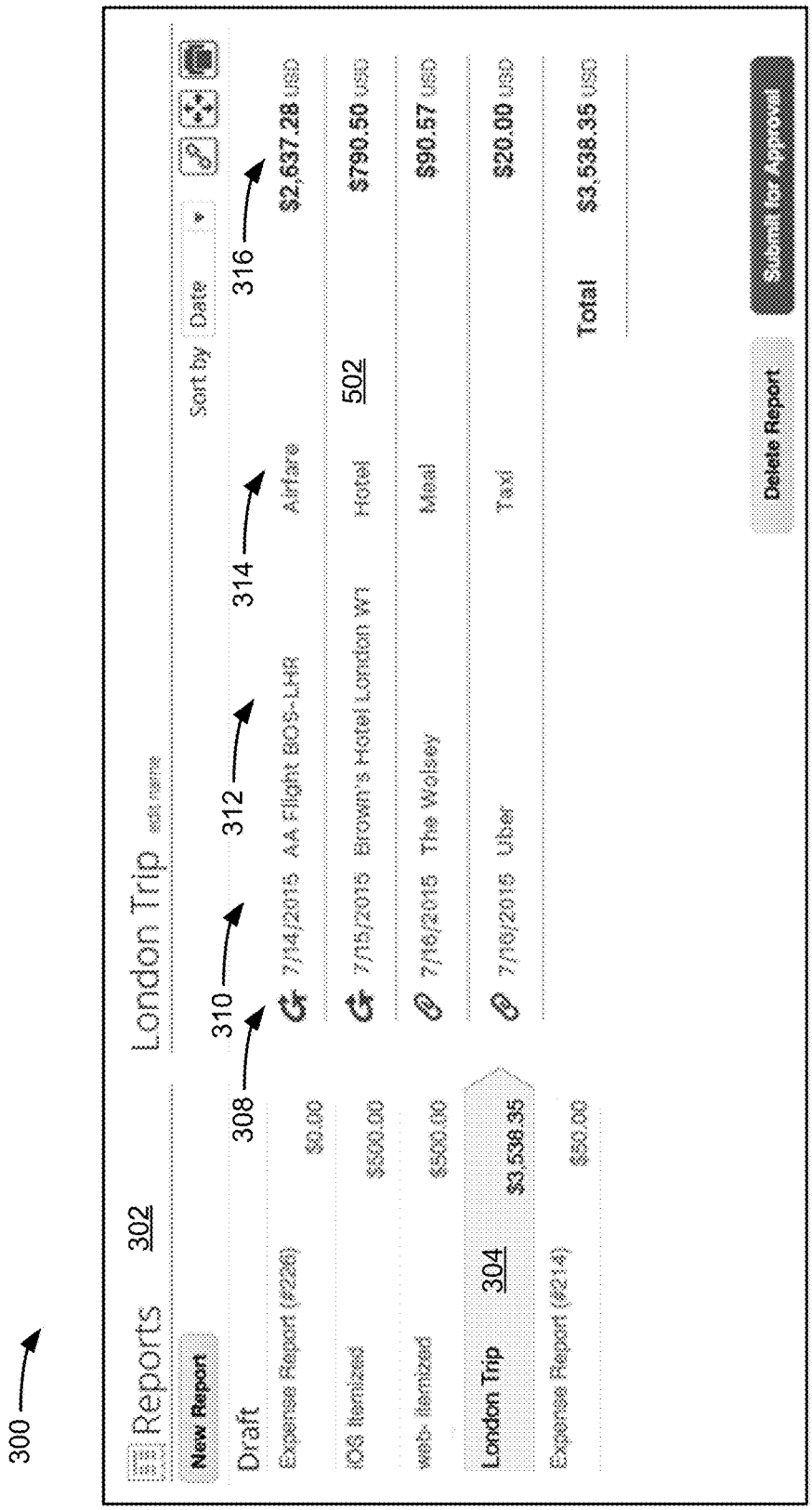
FIG. 5 is a portion of the user interface listing received expenses including the merged expense, according to various embodiments.

FIG. 5 is a portion of the user interface 300 listing received expenses including a merged expense 502, according to various embodiments. The merged expense 502 is from the source identifier 308 and vendor identifier 312 of the expense 318 because the mobile device 110 or user computer 102 had provided input that dragged the expense 306 into the expense 318. These properties of the merged expense 502 may be determined using other methods, such as based on a hierarchy of sources. The amount of the merged expense 502 is from the expense 306. The amount is determined because the expense 306 was received after the expense 312 was received.

Figure 6:
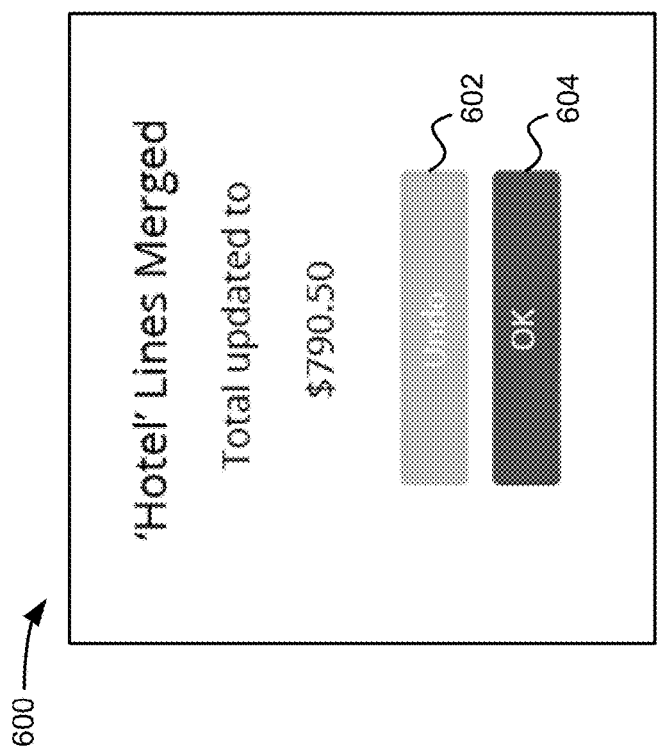
FIG. 6 is a portion of a user interface confirming that two expenses have been merged, according to various embodiments.

FIG. 6 is a portion of a user interface 600 confirming that two expenses have been merged, according to various embodiments. The user interface 600 may be a pop-up window provided by the expense client 108 or the mobile expense app 118. The user interface 600 includes a textual confirmation indicating that the "Hotel" lines are merged and the total amount is updated. The user interface 600 includes an undo button 602 which, if selected via input from the mobile device 110 or user computer 102, causes the merged expense to be returned to two unmerged expenses. The user interface 600 includes an OK button 604 that confirms the merging of the expenses.

Figure 7:
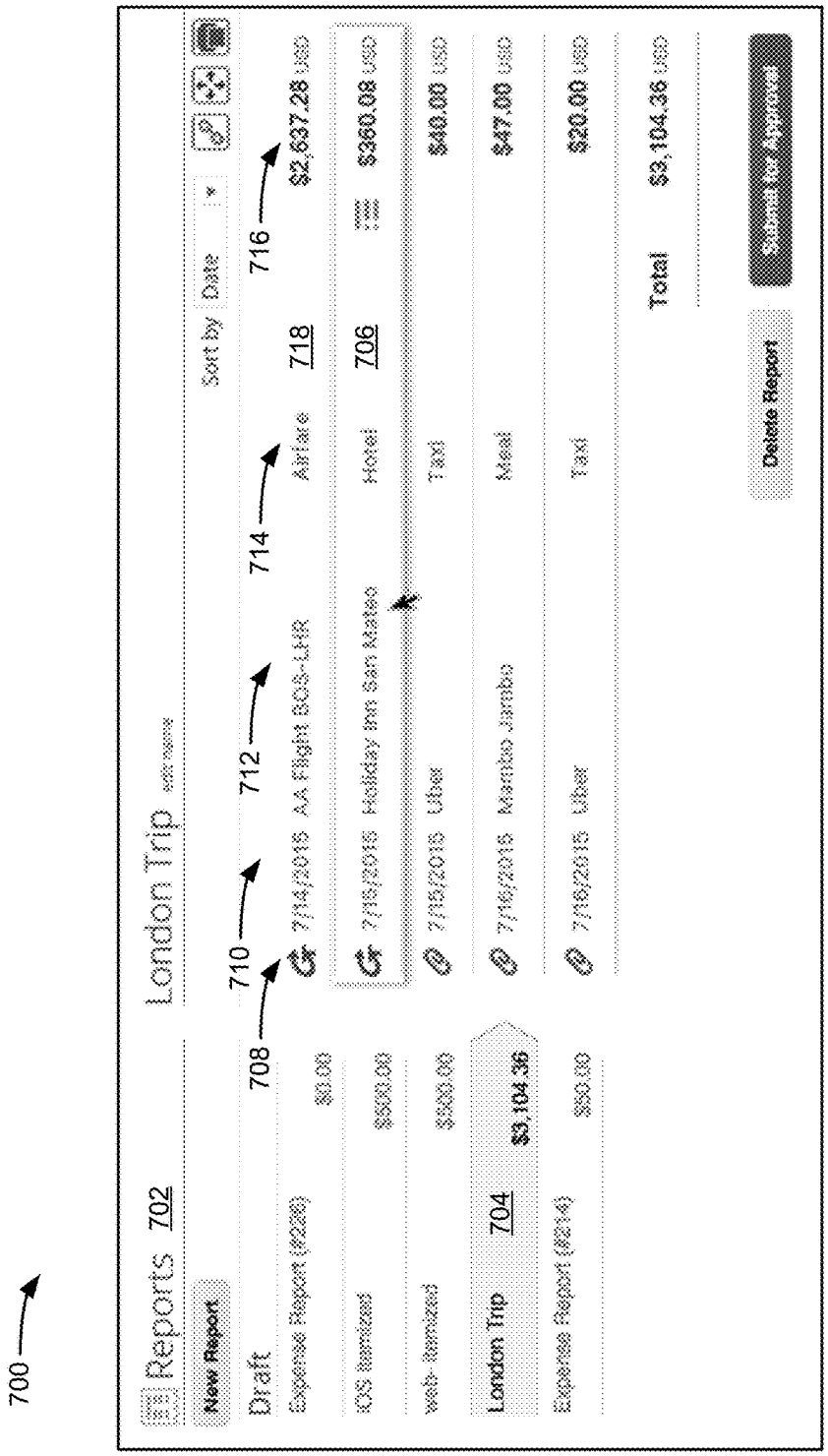
FIG. 7 is a portion of a user interface listing received expenses, according to various embodiments.

FIG. 7 is a portion of a user interface 700 listing received expenses, according to various embodiments. The user interface 700 may be provided by the expense client 108 or the mobile expense app 118. The user interface 700 includes a list of pending trip records labeled Reports 702. Report 704, labelled London Trip, is expanded on the right side of the user interface 700. The report 704 includes five expenses, including expense 706. Each of the expenses is associated with a source identifier 708 which indicates the source of the expense, a travel date 710, a short description of the expense or vendor identifier 712, a category 714, and an amount 716.

In the example shown in FIG. 7, the user, using the mobile device 110 or user computer 102, begins to provide a manual instruction to combine expenses 706, assigned to category Hotel, and 718, assigned to category Airfare, associated with different vendors and different amounts.

Figure 8:
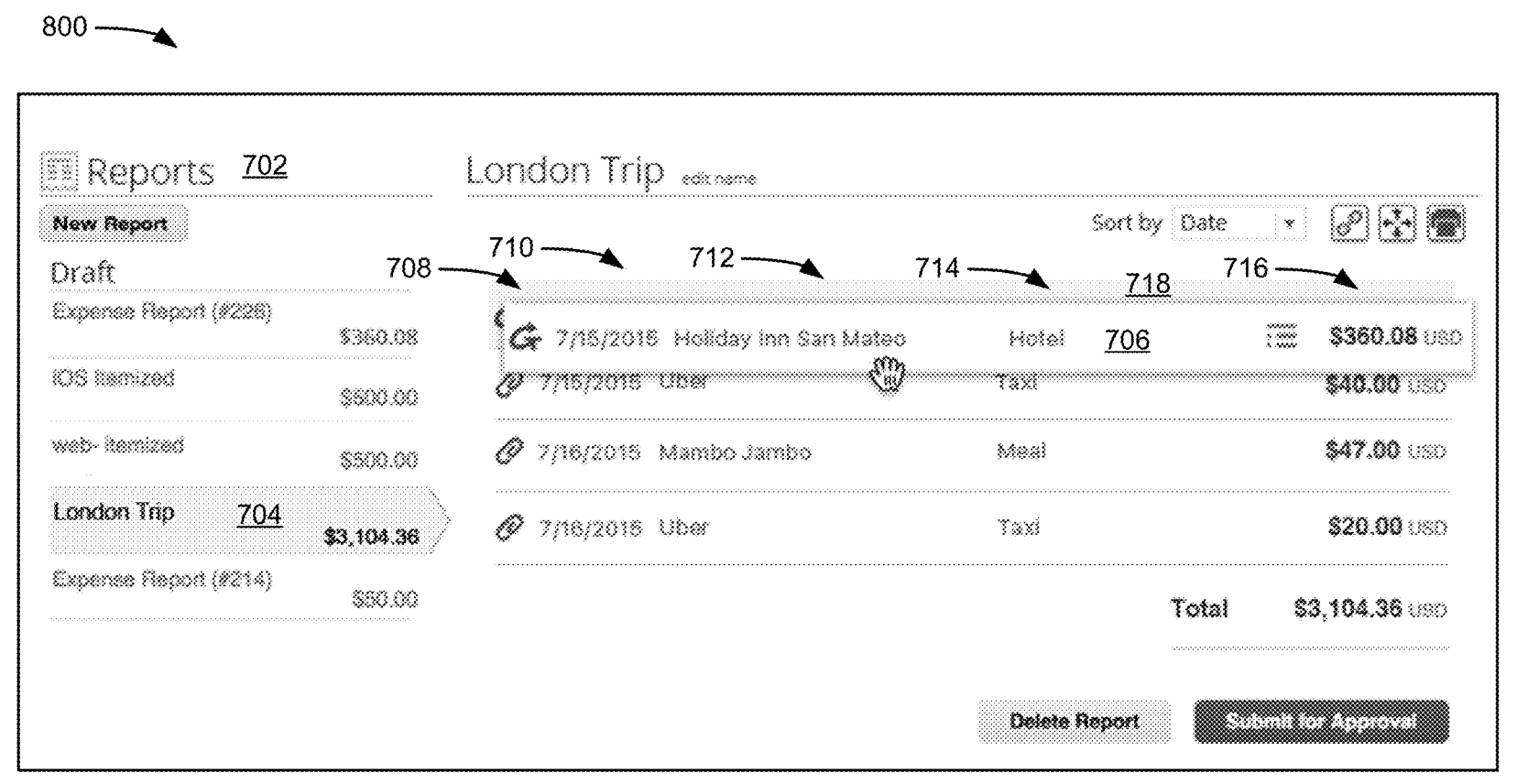

FIG. 8 is a portion of the user interface 700 depicting a drag and drop instruction to merge two expenses, according to various embodiments. The user, using the mobile device 110 or user computer 102, selects the expense 706 and drags it up to overlap with expense 718.

Figure 9:
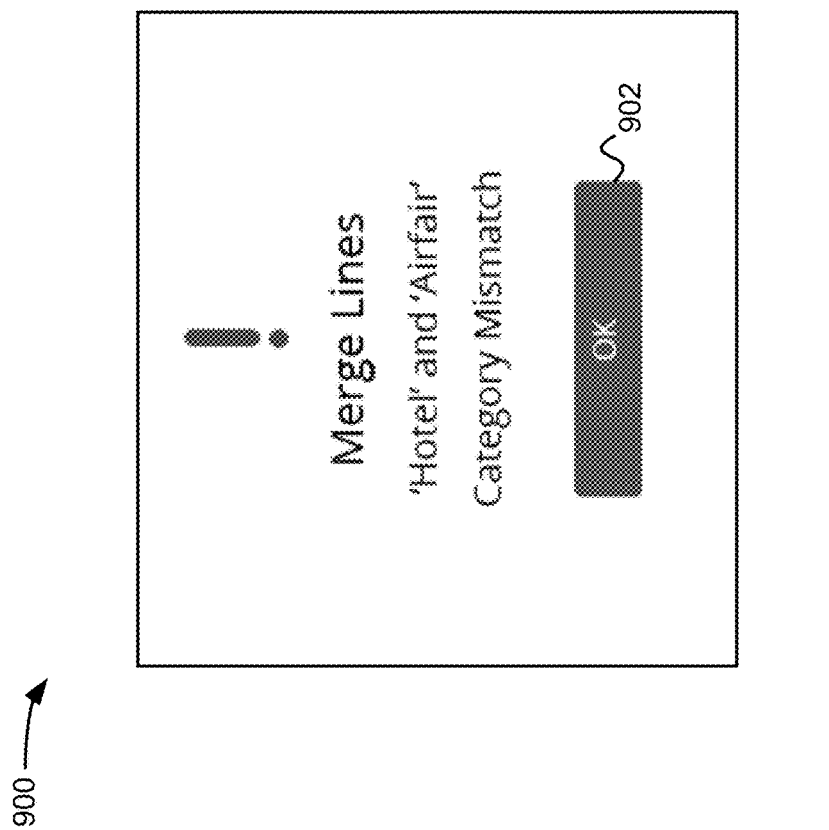
FIG. 9 is a portion of a user interface alerting that two expenses cannot be merged, according to various embodiments.

FIG. 9 is a portion of a user interface alerting that the two expenses 706 and 718 cannot be merged due to a category mismatch, according to various embodiments. The user interface 900 may be a pop-up window provided by the expense client 108 or the mobile expense app 118. The user interface 900 includes a textual confirmation indicating that the "Hotel" and "Airfare" lines are not merged due to a category mismatch. The user interface 900 includes an OK button 902 that causes the pop-up to be removed.

Receipt Capture

Figure 10:
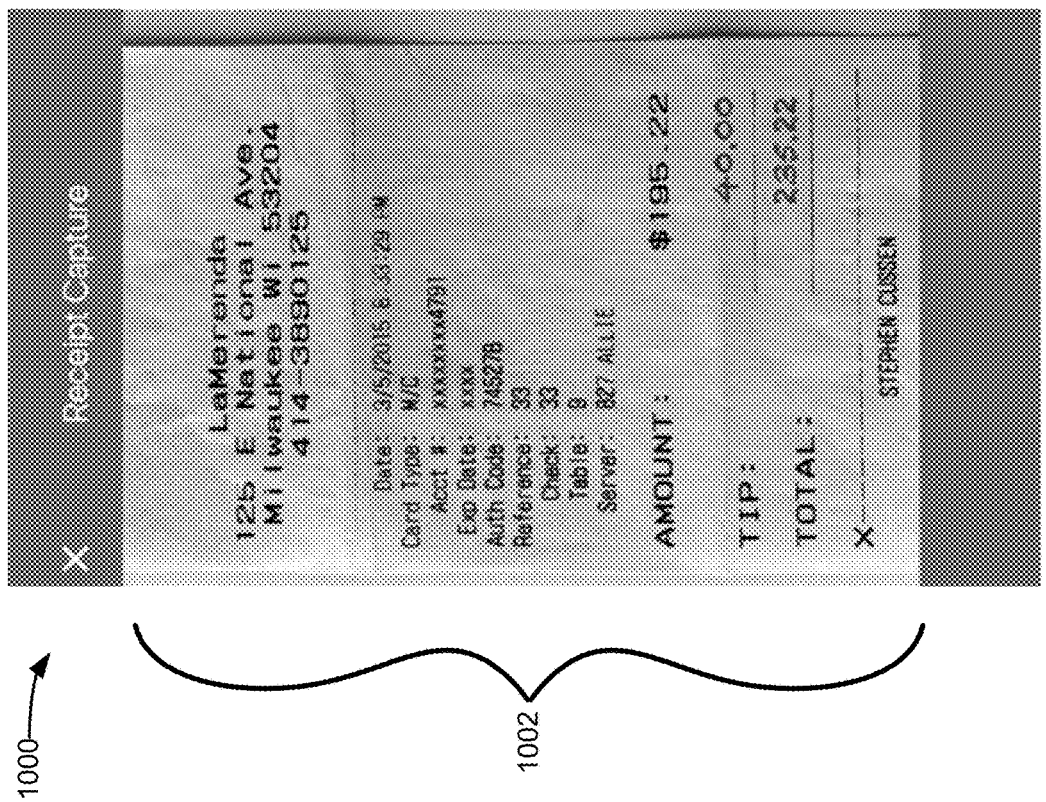
FIG. 10 is a portion of a user interface depicting an image capture of a receipt, according to various embodiments.

FIG. 10 is a portion of a user interface 1000 depicting an image capture of a receipt, according to various embodiments. The image capture may be initiated by the mobile expense app 118 and performed using the camera 112. The mobile device 110 captures image 1002 of a paper receipt at a restaurant including a total amount due and a tip amount.

Figures 11A, 11B:
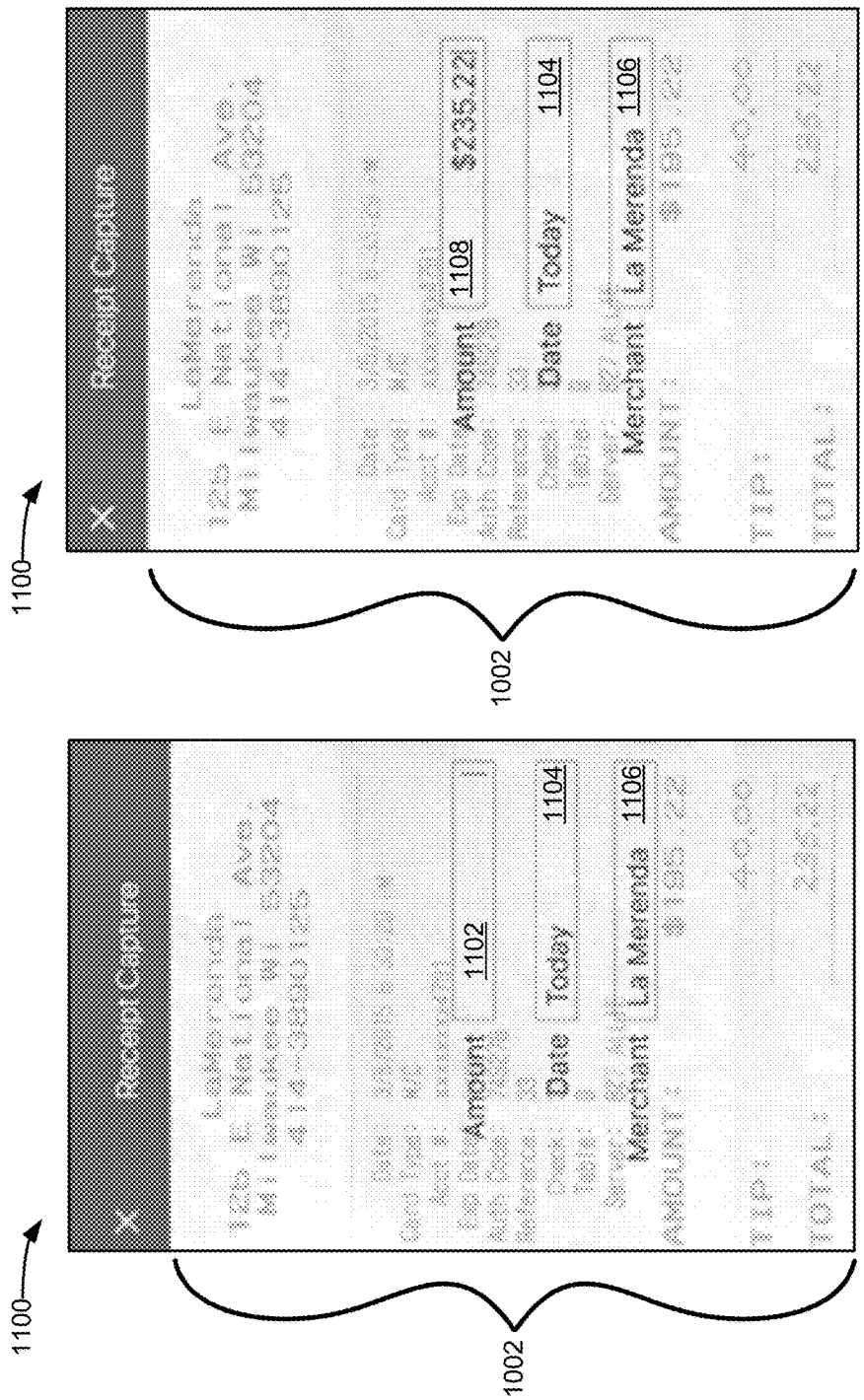
FIG. 11A is a portion of a user interface depicting the image of the receipt and one or more fields overlaid on the image, according to various embodiments.
FIG. 11B is a portion of the user interface depicting the image of the receipt and one or more filled fields overlaid on the image, according to various embodiments.

FIG. 11A is a portion of a user interface 1100 depicting the image 1002 of the receipt and one or more fields overlaid on the image, according to various embodiments. The fields include an amount field 1102 programmed to receive a total amount value from the mobile device 110. In some embodiments, optical character recognition (OCR) may be used to determine a total amount from the image 1002. A date field 1104 is set for "today" based on an assumption that the mobile device 110 is capturing the receipt at the date and time of the meal at the restaurant. The actual date is accessed from the mobile device 110 or other source. In some embodiments, optical character recognition (OCR) may be used to determine a date from the image 1002. A merchant field 1106 is automatically filled in using a Global Positioning System (GPS) or other location system on the mobile device 110. In some embodiments, optical character recognition (OCR) may be used to determine a merchant from the image 1002. The date field 1104 and the Merchant field 1106 are editable.

FIG. 11B is a portion of the user interface 1100 depicting the image 1002 of the receipt and one or more filled fields overlaid on the image, according to various embodiments. In FIG. 11B, the Amount field 1102 in filled in with Amount 1108 using, for example, a touch screen associated with mobile device 110.

Figure 12:
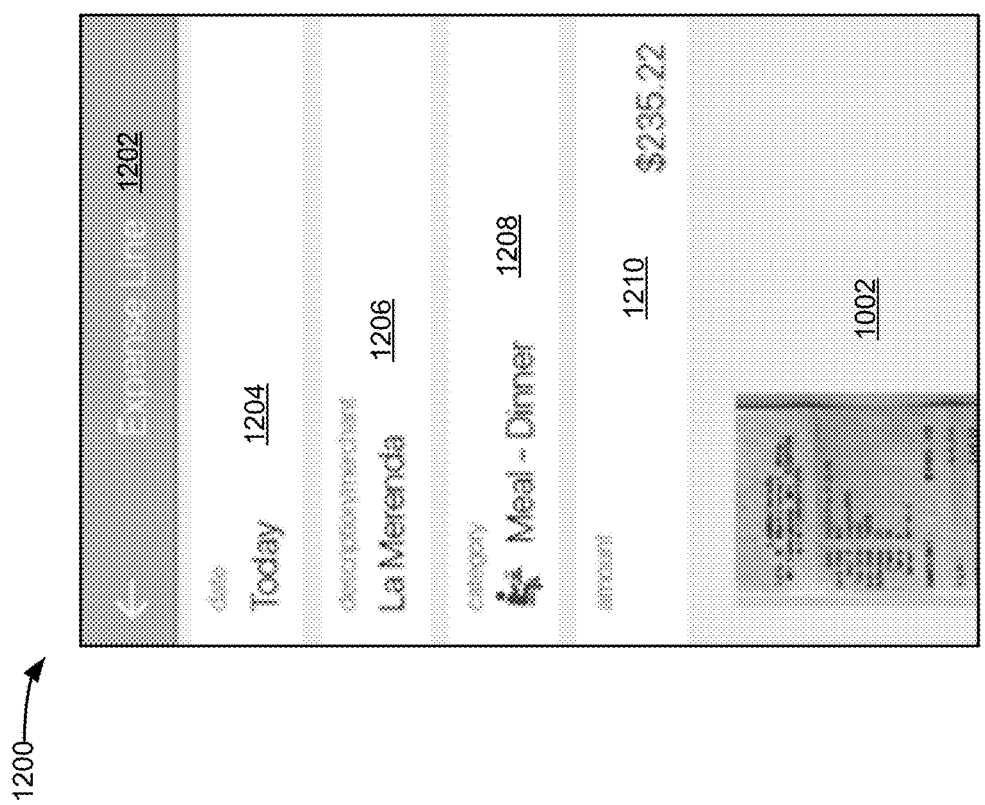
FIG. 12 is a portion of a user interface depicting an expense generated from the image of the receipt, according to various embodiments.

FIG. 12 is a portion of a user interface 1200 depicting an expense 1202 generated from the image 1002 of the receipt, according to various embodiments. The user interface 1200 depicts a detailed view of an expense line 1202 as it will appear in a trip or in a user interface like user interface 300 as an expense like expense 306. The expense line 1202 includes a date 1204, indicated as "Today" which may later be assigned a specific date, a short description 1206 naming the vendor, a category 1208 assigned as meal-dinner based on the time of day that the expense was received, and amount 1210 of the expense. When the credit card charge associated with the expense of FIG. 12 is posted, it may be combined with the expense of FIG. 12 according to the method of FIG. 2.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
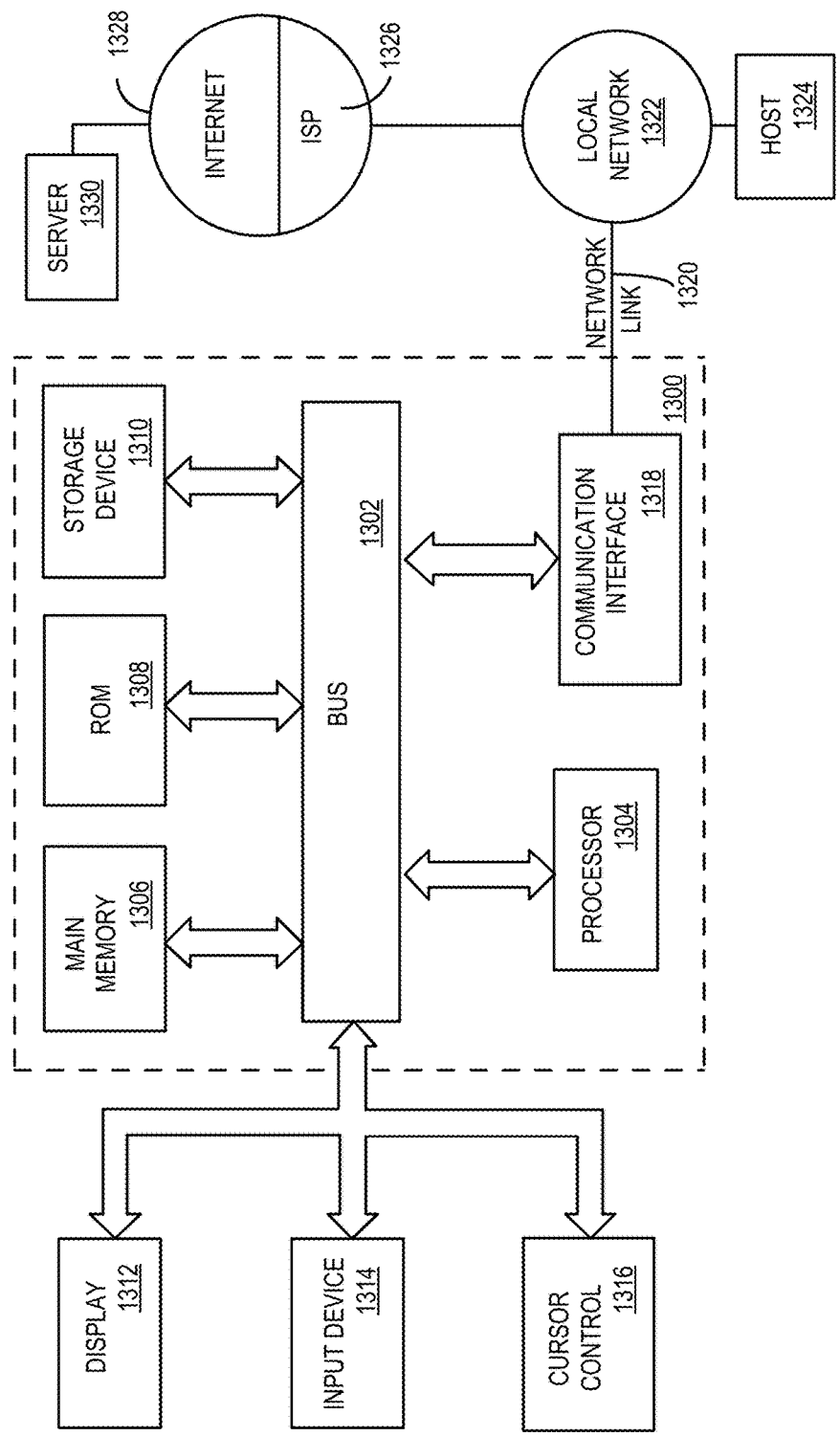
FIG. 13 is a block diagram that illustrates a computer system upon which an embodiment of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing system comprising:
   a memory having stored therein a plurality of expense records, each expense record of the plurality of expense records associated with a source of the expense record, a category of the expense record of a plurality of categories, one or more dates associated with the expense, a vendor, and an amount of the expense;

one or more processors;
a non-transitory machine-readable medium having instructions stored thereon, the instructions executable by the one or more processors to perform:
accessing, from the memory, a first expense record associated with a first range of dates and a first category of the plurality of categories;
generating a first trip record from the first expense record, the first trip record associated with the dates in the first range of dates;
accessing, from the memory, a second expense record associated with a first vendor, a first date, a first source, and a second category of the plurality of categories;
associating the second expense record with the first trip record in response to determining that the first date is one of the dates in the first range of dates;
accessing, from the memory, a third expense record associated with the first vendor, the first date, a second source, and the second category of the plurality of categories;
associating the third expense record with the first trip record in response to determining that the first date is one of the dates in the first range of dates;
combining the second expense record and the third expense record resulting in a merged expense record in response to determining that the second expense record and the third expense record are both associated with the first vendor, the first date, and the second category;
determining an amount of the merged expense record by selecting one of the second expense record and the third expense record and using the amount associated with the selected expense record as the merged expense record, wherein selecting one of the second expense record and the third expense record comprises selecting one of the first source associated with the second expense record or the second source associated with the third expense record according to a stored hierarchy indicating that one of the first source or the second source be selected over the other;
in response to determining an amount of the merged expense report, removing, from the memory, the second expense record and the third expense record;
submitting an expense report comprising the first expense record and the merged expense record for approval; and
in response to receiving approval of the expense report, causing one or more expense accounts to be credited.

2. The system of claim 1, wherein the non-transitory machine readable medium further comprises instructions executable by the one or more processors to perform comparing the first range of dates to a plurality of ranges of dates associated with previously generated trip records and determining that the first range of dates does not overlap with the plurality of ranges of dates associated with the previously generated trip records.

3. The system of claim 1, wherein the stored hierarchy is based on whether the third expense record was received after the second expense record.

4. The system of claim 1, wherein the non-transitory machine readable medium further comprises instructions executable by the one or more processors to perform:
accessing, from the memory, a fourth expense record associated with a second vendor, a third source and the first date;
associating the fourth expense record with the first trip record in response to determining that the first date is one of the dates in the first range of dates;
in response to a user input, disassociating the fourth expense record from the first trip record and associating the fourth expense record with a second trip record.

5. The system of claim 1, wherein the non-transitory machine readable medium further comprises instructions executable by the one or more processors to perform:
accessing, from the memory, a fourth expense record associated with a second vendor, a third source and a second date;
not associating the fourth expense record with the first trip record in response to determining that the second date is outside of the dates in the first range of dates;
in response to a user input, associating the fourth expense record from the first trip record.

6. The system of claim 1, wherein the non-transitory machine readable medium further comprises instructions executable by the one or more processors to perform:
accessing, from the memory, a fourth expense record associated with a second vendor, a third source, a second date, and a third category of the plurality of categories;
associating the fourth expense record with the first trip record in response to determining that the second date is one of the dates in the first range of dates;
accessing, from the memory, a fifth expense record associated with a third vendor, the second date, a fourth source, and the third category of the plurality of categories;
associating the fifth expense record with the first trip record in response to determining that the second date is one of the dates in the first range of dates;
in response to a first user input, combining the fourth expense record and the fifth expense record resulting in a merged expense record;
in response to a second user input, determining an amount of the merged expense record.

7. The system of claim 6, wherein the non-transitory machine readable medium further comprises instructions executable by the one or more processors to perform:
in response to the first user input, determining that the fourth expense record and the fifth expense record are both associated with the third category.

8. The system of claim 1, wherein the first source is an email client, a mobile application, a camera application, or a credit card transaction feed.

9. The system of claim 1, wherein the plurality of categories includes lodging, transportation, food, beverages, entertainment, personal services, and business services and supplies.

10. A method comprising:
storing, in a memory, a plurality of expense records, each expense record of the plurality of expense records associated with a source of the expense record, a category of the expense record of a plurality of categories, one or more dates associated with the expense, a vendor, and an amount of the expense;
using a first computer, accessing, from the memory, a first expense record associated with a first range of dates and a first category of the plurality of categories;
using the first computer, generating a first trip record from the first expense record, the first trip record associated with the dates in the first range of dates;
using the first computer, accessing, from the memory, a second expense record associated with a first vendor, a first date, a first source, and a second category of the plurality of categories;

using the first computer, associating the second expense record with the first trip record in response to determining that the first date is one of the dates in the first range of dates;

using the first computer, accessing, from the memory, a third expense record associated with the first vendor, the first date, a second source, and the second category of the plurality of categories;

using the first computer, associating the third expense record with the first trip record in response to determining that the first date is one of the dates in the first range of dates;

using the first computer, combining the second expense record and the third expense record resulting in a merged expense record in response to determining that the second expense record and the third expense record are both associated with the first vendor, the first date, and the second category;

using the first computer, determining an amount of the merged expense record by selecting one of the second expense record and the third expense record and using the amount associated with the selected expense record as the merged expense record, wherein selecting one of the second expense record and the third expense record comprises selecting one of the first source associated with the second expense record or the second source associated with the third expense record according to a stored hierarchy indicating that one of the first source or the second source be selected over the other;

using the first computer, in response to determining an amount of the merged expense report, removing, from the memory, the second expense record and the third expense record;

using the first computer, submitting an expense report comprising the first expense record and the merged expense record for approval;

using the first computer, in response to receiving approval of the expense report, causing one or more expense accounts to be credited.

11. The method of claim 10, further comprising comparing the first range of dates to a plurality of ranges of dates associated with previously generated trip records and determining that the first range of dates does not overlap with the plurality of ranges of dates associated with the previously generated trip records.

12. The method of claim 10, wherein the stored hierarchy is based on whether the third expense record was received after the second expense record.

13. The method of claim 10, further comprising:
using the first computer, accessing, from the memory, a fourth expense record associated with a second vendor, a third source and the first date;

using the first computer, associating the fourth expense record with the first trip record in response to determining that the first date is one of the dates in the first range of dates;

using the first computer, in response to a user input, disassociating the fourth expense record from the first trip record and associating the fourth expense record with a second trip record.

14. The method of claim 10, further comprising:
using the first computer, accessing, from the memory, a fourth expense record associated with a second vendor, a third source and a second date;

not associating the fourth expense record with the first trip record in response to determining that the second date is outside of the dates in the first range of dates;

using the first computer, in response to a user input, associating the fourth expense record from the first trip record.

15. The method of claim 10, further comprising:
using the first computer, accessing, from the memory, a fourth expense record associated with a second vendor, a third source, a second date, and a third category of the plurality of categories;

using the first computer, associating the fourth expense record with the first trip record in response to determining that the second date is one of the dates in the first range of dates;

using the first computer, accessing, from the memory, a fifth expense record associated with a third vendor, the second date, a fourth source, and the third category of the plurality of categories;

using the first computer, associating the fifth expense record with the first trip record in response to determining that the second date is one of the dates in the first range of dates;

using the first computer, in response to a first user input, combining the fourth expense record and the fifth expense record resulting in a merged expense record;

using the first computer, in response to a second user input, determining an amount of the merged expense record.

16. The method of claim 15, further comprising, using the first computer, in response to the first user input, determining that the fourth expense record and the fifth expense record are both associated with the third category.

17. The method of claim 10, wherein the first source is an email client, a mobile application, a camera application, or a credit card transaction feed.

18. The method of claim 10, wherein the plurality of categories includes lodging, transportation, food, beverages, entertainment, personal services, and business services and supplies.

* * * * *